(12) United States Patent
Umesh et al.

(10) Patent No.: US 8,917,728 B2
(45) Date of Patent: *Dec. 23, 2014

(54) RETRANSMISSION REQUEST TRANSMITTING METHOD AND RECEIVING-SIDE APPARATUS

(75) Inventors: Anil Umesh, Yokohama (JP); Yasuhiro Kato, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 697 days.

This patent is subject to a terminal disclaimer.

(21) Appl. No.: 12/594,893

(22) PCT Filed: Apr. 4, 2008

(86) PCT No.: PCT/JP2008/056811
§ 371 (c)(1),
(2), (4) Date: Oct. 6, 2009

(87) PCT Pub. No.: WO2008/126806
PCT Pub. Date: Oct. 23, 2008

(65) Prior Publication Data
US 2010/0118779 A1   May 13, 2010

(30) Foreign Application Priority Data
Apr. 6, 2007  (JP) ............................... P2007-101188

(51) Int. Cl.
*H04L 12/28* (2006.01)
*H04L 1/16* (2006.01)
*H04L 1/18* (2006.01)

(52) U.S. Cl.
CPC ............ *H04L 1/1607* (2013.01); *H04L 1/1854* (2013.01); *H04L 1/1848* (2013.01); *H04L 1/1835* (2013.01); *H04L 1/1841* (2013.01)
USPC ........................................ 370/394

(58) Field of Classification Search
CPC ... H04L 1/1841; H04L 1/1851; H04L 1/1621; H04L 12/1872
USPC .......................... 370/328, 394; 714/748, 749
See application file for complete search history.

(56) References Cited

U.S. PATENT DOCUMENTS 6,381,215 B1   4/2002 Hamilton et al.
7,761,767 B2 *  7/2010 Chandra et al. ............... 714/751
(Continued)

FOREIGN PATENT DOCUMENTS

JP   2003-283596 A   10/2003
WO   01/37473 A1    5/2001
(Continued)

OTHER PUBLICATIONS

InterDigital, "Reordering in Enhanced Cell_Fach", 3GPP TSG-RAN WG2#57bis, R2-071185, Mar. 26-30, 2007.*

(Continued)

*Primary Examiner* — Brandon Renner
*Assistant Examiner* — Scott M Sciacca
(74) *Attorney, Agent, or Firm* — Osha Liang LLP

(57) ABSTRACT

In a retransmission request transmitting method, an RLC sublayer of a receiving-side apparatus determines whether or not an RLC-PDU-data (or an RLC-data-Sub-PDU) not received yet is under retransmission control processing in a MAC sublayer; and generates and transmits a STATUS-PDU (NACK) including only a RLC-data-PDU which has neither been received yet nor is under the retransmission control processing in the MAC sublayer, on the basis of the determination result, at a timing when the STATUS-PDU is generated.

2 Claims, 7 Drawing Sheets

(56) References Cited

U.S. PATENT DOCUMENTS

| | | | | |
|---|---|---|---|---|
| 2003/0128705 | A1* | 7/2003 | Yi et al. | 370/394 |
| 2003/0169741 | A1* | 9/2003 | Torsner et al. | 370/394 |
| 2003/0210669 | A1* | 11/2003 | Vayanos et al. | 370/335 |
| 2007/0042782 | A1* | 2/2007 | Lee et al. | 455/450 |
| 2008/0008152 | A1* | 1/2008 | Lohr et al. | 370/342 |
| 2008/0137564 | A1* | 6/2008 | Herrmann | 370/310 |
| 2008/0209297 | A1* | 8/2008 | Chandra et al. | 714/748 |
| 2008/0225765 | A1* | 9/2008 | Marinier et al. | 370/310 |
| 2009/0310534 | A1* | 12/2009 | Lindskog et al. | 370/328 |
| 2010/0027565 | A1* | 2/2010 | Gupta et al. | 370/475 |
| 2010/0054139 | A1* | 3/2010 | Chun et al. | 370/252 |

FOREIGN PATENT DOCUMENTS

| | | |
|---|---|---|
| WO | 02091659 A2 | 11/2002 |
| WO | 03058852 A1 | 7/2003 |
| WO | 2005/117317 A1 | 12/2005 |

OTHER PUBLICATIONS

Siemens, "ARQ operation and HARQ," 3GPP TSG-RAN WG2 #55, R2-062843; Oct. 9-13, 2006; 4 pages.
NTT DoCoMo et al., "MAC reordering for LTE," 3GPP TSG RAN WG2 Meeting #55, R2-062907; Oct. 9-13, 2006; 2 pages.
Siemens, "Outer ARQ," 3GPP TSG-RAN WG RAN2 #50, R2-060099, Jan. 9-13, 2006; 4 pages.
3GPP TS 36.300 V8.0.0 (Mar. 2007), "Evolved Universal Terrestrial Radio Access (E-UTRA) and Evolved Universal Terrestrial Radio Access Network (E-UTRAN)," 82 pages.
3GPP TS 25.322 V6.9.0 (Sep. 2006), "Radio Link Control (RLC) protocol specification," 86 pages.
International Search Report issued in PCT/JP2008/056811, mailed on Jun. 10, 2008, with translation, 3 pages.
Written Opinion issued in PCT/JP2008/056811, mailed on Jun. 10, 2008, 3 pages.
Japanese Office Action for Application No. 2009-509331, mailed Mar. 8, 2011, and English translation thereof, 4 pages.
Japanese Office Action for Application No. 2009-509331, mailed on Jun. 29, 2010 (5 pages).
Patent Abstracts of Japan for Japanese Publication No. 2003-283596, publication date Oct. 3, 2003 (1 pages).
Office Action for Australian Patent Application No. 2008239082 issued Nov. 20, 2012 (3 pages).
Office Action for Chinese Application No. 200880011506.5 dated Jan. 30, 2013, with English translation thereof (11 pages).
3GPP TSG-RAN2 Meeting #57-bis, R2-071479; "RLC/HARQ Local Gap Detection at the Receiver"; Qualcomm Europe; St Julian, Malta, Mar. 26-30, 2007 (2 pages).
3GPP TSG-RAN WG2 Meeting #55, R2-062959; "HARQ and RLC interactions"; Qualcomm Europe; Seoul, Korea, Oct. 9-13, 2006 (3 pages).
Extended European Search Report for 08739917.6 dated Oct. 4, 2013 (6 pages).
Office Action in corresponding Chinese Patent Application No. 200880011506.5 dated Oct. 17, 2013, with translation (14 pages).
Official Action letter dated Jul. 1, 2014, in counterpart European Patent application No. 08739917.6 (5 pages).

* cited by examiner

FIG. 7

STATUS-PDU (NACK)

| | 0 | 1 | 2 | 3 | 4 | 5 | 6 | 7 |
|---|---|---|---|---|---|---|---|---|
| | Type | | | Control PDU Type | | | | Reserve |
| | Selective NACK SN | | | | | | | |
| | Selective NACK First Octet | | | | | | | Reserve |
| | Selective NACK Last Octet | | | | | | | |
| | Selective NACK SN | | | | | | | |
| | Selective NACK First Octet | | | | | | | Reserve |
| | Selective NACK Last Octet | | | | | | | |

US 8,917,728 B2

RETRANSMISSION REQUEST TRANSMITTING METHOD AND RECEIVING-SIDE APPARATUS

TECHNICAL FIELD

The present invention relates to a retransmission request transmitting method in which a predetermined sublayer of a receiving-side apparatus transmits a retransmission request for a packet transmitted from a predetermined sublayer of a transmitting-side apparatus, and also relates to the receiving-side apparatus.

BACKGROUND ART

In 3GPP, which is an organization that sets standards for third generation mobile communications systems, a study collectively termed as LTE (Long Term Evolution) has been conducted for achieving a drastic improvement of transmission speed and reduction of transmission delay in a radio access network (RAN); and formulation of standard specifications of the elemental technologies related to the study has been in progress.

As shown in FIG. 4, the radio access network (E-UTRAN: Evolved Universal Terrestrial RAN) in an LTE mobile communication system includes a mobile station UE (User Equipment) and a radio base station eNB (E-UTRAN Node B). This system is configured in such a way that the mobile station UE and the radio base station eNB communicate with each other via a radio link (RL).

Moreover, each of the mobile station UE and the radio base station eNB is configured to terminate an RLC (Radio Link Control) sublayer, a MAC (Medium Access Control) sublayer and a physical (PHY: Physical) layer.

In addition, a transmitting-side apparatus (mobile station UE or radio base station eNB) is configured to perform RLC processing, MAC processing and PHY processing sequentially for data to be transmitted, and then to transmit the data as radio signals from a radio unit.

Meanwhile, a receiving-side apparatus (mobile station UE or radio base station eNB) is configured to extract the transmitted data by performing PHY processing, MAC processing and RLC processing sequentially for the radio signals received by a radio unit.

Here, the data to be transmitted includes user data (U-plane data) generated by an application or the like used by the user, and control data (C-plane data) used in controlling the mobile communication system, such as RRC (Radio Resource Control) signaling and NAS (Non Access Stratum) signaling.

Moreover, this system is configured in such a way that RLC retransmission control processing is performed between the RLC sublayer of the transmitting-side apparatus and the RLC sublayer of the receiving-side apparatus, and that HARQ (Hybrid Automatic Repeat Request) retransmission control processing (MAC retransmission control processing) is performed between the MAC sublayer of the transmitting-side apparatus and the MAC sublayer of the receiving-side apparatus.

Here, in an IMT-2000 mobile communication system, a receiving-side apparatus is configured so that the MAC sublayer performs reordering processing for received RLC-PDUs (actually, MAC-PDUs to which the RLC-PDUs are mapped), and then transmits the RLC-PDUs to the RLC sublayer in the order of the sequence numbers, as shown in FIG. 1.

Accordingly, for RLC-data-PDUs (AMD-PDUs in the IMT-2000 mobile communication system; RLC-data-PDUs with sequence numbers #2 and #5) which have not yet been received but their subsequent RLC-data-PDU (RLC-data-PDU with sequence numbers #6) has been received when a STATUS-PDU generation trigger occurs as shown in FIG. 2, the RLC sublayer is configured to unconditionally determine that the packets are missing and to transmit a STATUS-PDU that requests retransmission of the RLC-data-PDUs with the sequence numbers #2 and #5.

Non-Patent Document 1: RLC Specification of IMT-2000: 3GPP TS 25.322 V6.9.0 (2006-09)

Non-Patent Document 2: LTE Stage 2 Specification: 3GPP TS 36.300 V8.0.0 (2007-03)

However, in the LTE mobile communication system, as shown in FIG. 3, a MAC sublayer is configured to transmit an RLC-PDU to an RLC sublayer without performing reordering processing for received RLC-PDUs in a receiving-side apparatus.

Thus, even though there exist RLC-data-PDUs (or RLC-data-Sub-PDUs) that have not yet been received by the RLC sublayer but their subsequent RLC-data-PDU (or RLC-data-Sub-PDU) has been received when a STATUS-PDU generation and transmission trigger occurs, it is not appropriate to unconditionally transmit a STATUS-PDU that requests retransmission of the RLC-data-PDUs (RLC-PDUs with the sequence numbers #2 and #5 in FIG. 2, for example). This is because there is a possibility that the RLC-data-PDU is in HARQ retransmission control processing in the MAC sublayer.

In this respect, the present invention has been made in view of the aforementioned problem. An object of the present invention is to provide a retransmission request transmitting method and a receiving-side apparatus in which an RLC sublayer can be prevented from transmitting a retransmission request for an RLC-data-PDU being in HARQ retransmission control processing in a MAC sublayer, in a case where the MAC sublayer does not perform reordering processing for received RLC-PDUs.

A first aspect of the present invention is summarized as a retransmission request transmitting method in which a predetermined sublayer of a receiving-side apparatus transmits a retransmission request for a packet transmitted from a predetermined sublayer of a transmitting-side apparatus, the method including the steps of: determining, at the predetermined sublayer of the receiving-side apparatus, whether or not a packet not received yet is under retransmission control processing in a lower sublayer of the predetermined sublayer of the receiving-side apparatus; and generating and transmitting, at the predetermined sublayer of the receiving-side apparatus, the retransmission request including only a packet which has neither been received yet nor is under the retransmission control processing in the lower sublayer, on the basis of the determination result, at a timing when the retransmission request is generated.

In the first aspect, the predetermined sublayer of the receiving-side apparatus cam manage the determination result as a state variable; and the predetermined sublayer of the receiving-side apparatus can, on the basis of the state variable, generate and transmit the retransmission request including only a packet which has neither been received yet nor is under the retransmission control processing in the lower sublayer.

A second aspect of the present invention is summarized as a receiving-side apparatus configured to transmit, from a predetermined sublayer, a retransmission request for a packet transmitted from a predetermined sublayer of a transmitting-side apparatus, wherein the predetermined sublayer is configured to determine whether or not a packet not received yet is under retransmission control processing performed in a lower sublayer of the predetermined sublayer, and the predetermined sublayer is configured to generate and transmit the retransmission request including only a packet which has neither been received yet nor is under the retransmission control processing in the lower sublayer, on the basis of the determination result, at a timing when the retransmission request is generated.

In the second aspect, the predetermined sublayer can be configured to manage the determination result as a state variable; and the predetermined sublayer can be configured to generate and transmit the retransmission request including only a packet which has neither been received yet nor is under the retransmission control processing in the lower sublayer, on the basis of the state variable.

As described above, according to the present invention, it is possible to provide a retransmission request transmitting method and a receiving-side apparatus in which an RLC sublayer can be prevented from transmitting a retransmission request for an RLC-data-PDU being in HARQ retransmission control processing in a MAC sublayer, in a case where the MAC sublayer does not perform reordering processing for received RLC-PDUs.

BRIEF DESCRIPTION OF THE DRAWINGS

FIG. 7 is a diagram showing an example of a format of a STATUS-PDU to be generated by an RLC sublayer in a mobile station and a radio base station according to the first embodiment of the present invention.

BEST MODE FOR CARRYING OUT THE INVENTION (Configuration of Mobile Communication System According to First Embodiment of the Present Invention)

A description will be given of a configuration of a mobile communication system according to a first embodiment of the present invention with reference to FIGS. 4 to 8.

Figure 1:
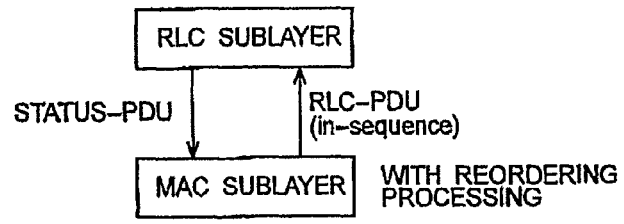
FIG. 1 is a diagram for describing an operation in a receiving-side apparatus of a conventional mobile communication system.
Figure 2:
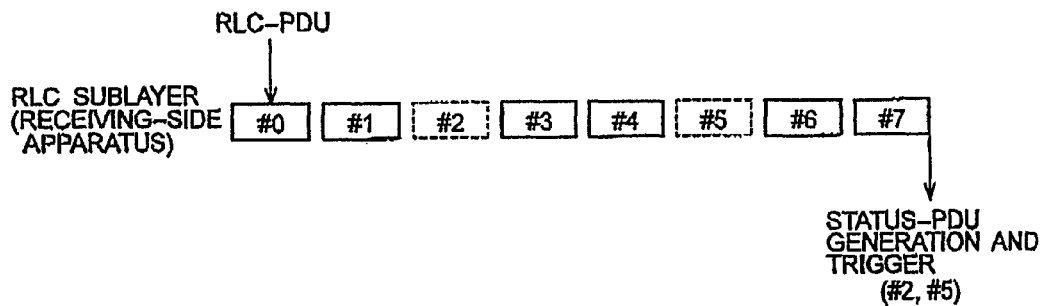
FIG. 2 is a diagram for describing an operation in the receiving-side apparatus of the conventional mobile communication system.
Figure 3:
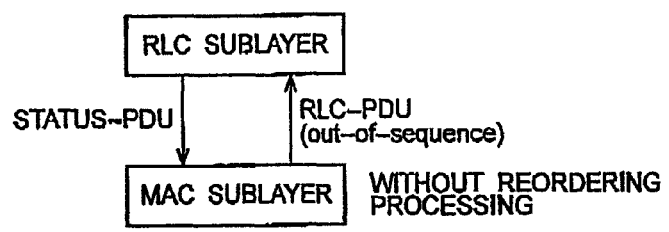
FIG. 3 is a diagram for describing an operation in the receiving-side apparatus of the conventional mobile communication system.
Figure 4:
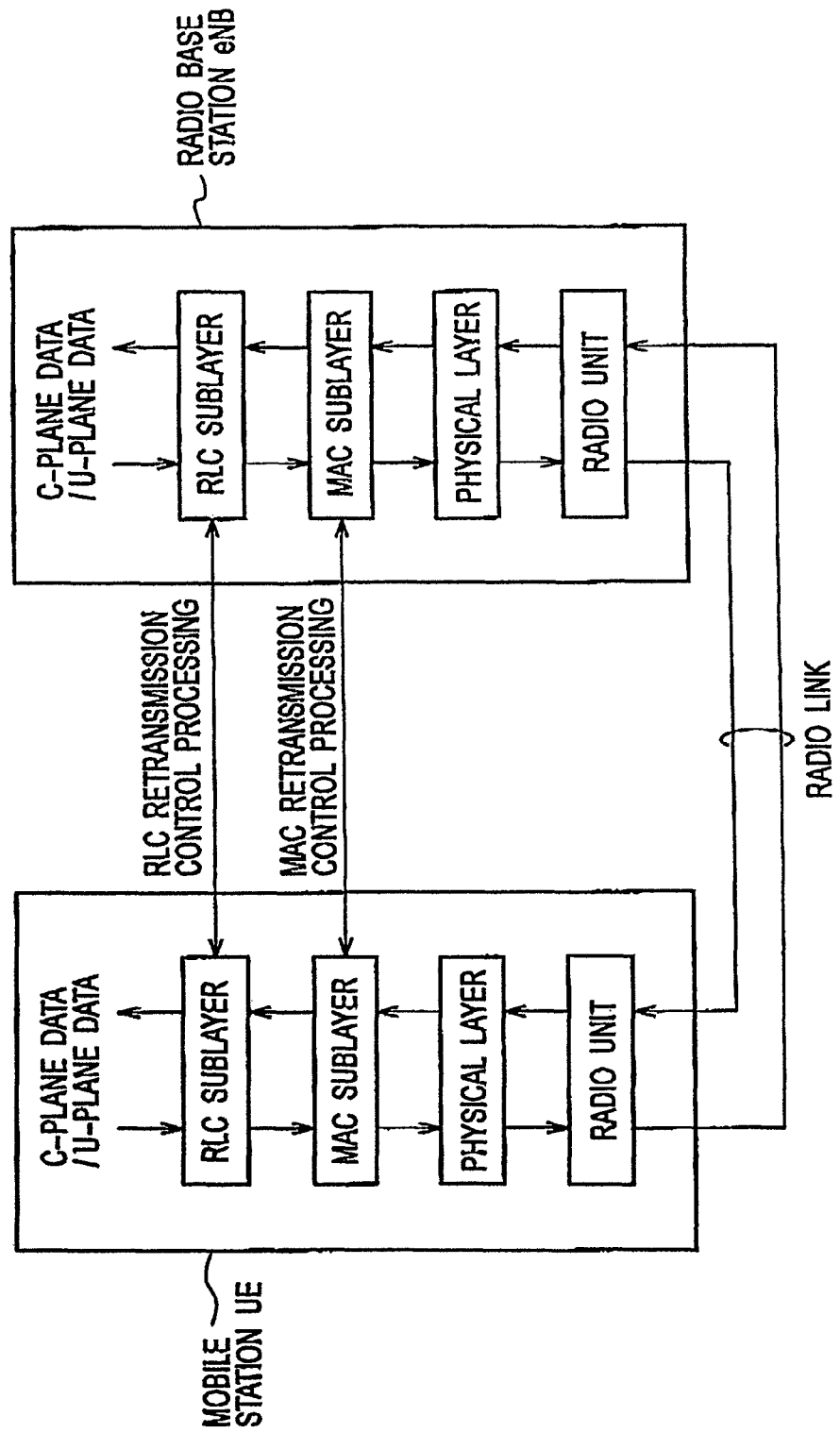
FIG. 4 is a diagram showing a protocol layer configuration in a radio access network of a mobile communication system according to a first embodiment of the present invention.

Note that, in this embodiment, the description will be given of a mobile communication system including an LTE/SAE (System Architecture Evolution) architecture for which standardization by the 3GPP has been in progress, as an example, as shown in FIG. 4, but the present invention is not limited to the mobile communication system, and is applicable to a mobile communication system including another architecture.

A description will be given of a functional configuration of an RLC sublayer of Acknowledge mode (AM) (hereinafter, referred to as RLC sublayer) with reference to FIG. 5.

Figure 5:
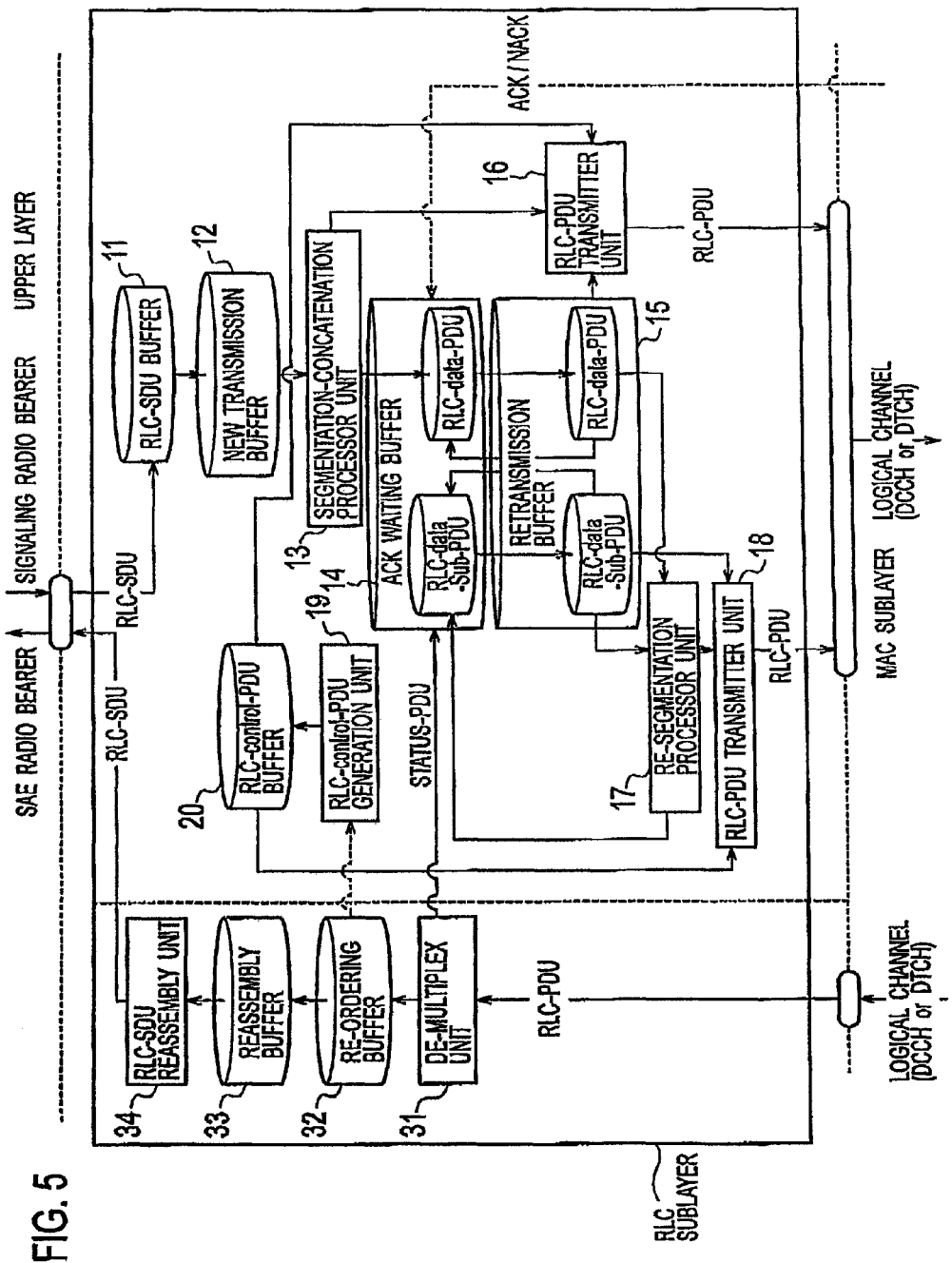
FIG. 5 is a functional block diagram of an RLC sublayer in a mobile station and a radio base station according to the first embodiment of the present invention.

Note that, a part of or all of the functions (modules) constituting the RLC sublayer shown in FIG. 5 may be implemented by hardware or software on an IC chip.

For example, on an IC chip, functions (modules) constituting a MAC sublayer and a physical layer for which simple and high speed processing is generally required may be configured to be implemented by hardware, and functions (modules) constituting the RLC sublayer for which complex processing is generally required may be configured to be implemented by software.

In addition, a function (module) constituting the physical layer, a function (module) constituting the MAC sublayer and a function (module) constituting the RLC sublayer may be implemented on the same IC chip, or may be implemented on different IC chips, respectively.

Hereinafter, an example of a configuration of the RLC sublayer in the mobile communication system according to this embodiment will be shown with reference to FIG. 5.

As shown in FIG. 5, the RLC sublayer includes an RLC-SDU buffer 11, a new transmission buffer 12, a segmentation-concatenation processor unit 13, an ACK waiting buffer 14, a retransmission buffer 15, an RLC-PDU transmitter unit 16, a re-segmentation processor unit 17, an RLC-PDU transmitter unit 18, an RLC-control-PDU generation unit 19, an RLC-control-PDU buffer 20, a de-multiplex unit 31, an reordering buffer 32, a reassembly buffer 33 and an RLC-SDU reassembly unit 34.

The RLC-SDU buffer 11 is configured to store an RLC-SDU received from an upper layer therein.

The new transmission buffer 12 is configured to copy the RLC-SDU stored in the RLC-SDU buffer 11 and then to store the RLC-SDU therein.

The segmentation-concatenation processor unit 13 is configured to perform segmentation processing or concatenation processing for the RLC-SDU (or a part thereof) stored in the new transmission buffer 12, and thereby to generate an RLC-data-PDU whose size becomes the largest within a range of an allowable amount of transmission data notified from a MAC sublayer along with a notification, in a case where a data transmission event is notified by the MAC sublayer.

In addition, the segmentation-concatenation processor unit 13 is configured to transmit the generated RLC-data-PDU to the RLC-PDU transmitter unit 16, and also to cause the generated RLC-data-PDU to be stored in the ACK waiting buffer 14.

The ACK waiting buffer 14 is configured to store, therein, the RLC-data-PDU from the segmentation-concatenation processor unit 13, an RLC-data-PDU or an RLC-data-Sub-PDU from the retransmission buffer 15, and an RLC-data-Sub-PDU from the re-segmentation processor unit 17.

The ACK waiting buffer 14 is configured to determine whether or not retransmission for the stored RLC-data-PDU or RLC-data-Sub-PDU is necessary, and to transmit, to the retransmission buffer 15, the RLC-data-PDU or RLC-data-Sub-PDU for which a determination is made that retransmission thereof is necessary.

Here, for example, the ACK waiting buffer 14 determines whether or not it is necessary for the stored RLC-data-PDU or RLC-data-Sub-PDU to be retransmitted in a case where a STATUS-PDU (NACK) from the RLC sublayer and in a case where a NACK from the MAC sublayer of the receiving-side apparatus are received.

In FIG. 7, a format example of a STATUS-PDU (NACK) used in the mobile communication system according to the present embodiment is shown.

As shown in FIG. 7, the STATUS-PDU (NACK) includes a "Type" field, a "Control PDU Type" field, a "Selective NACK SN" field, a "Selective NACK First Octet" field and a "Selective NACK Last Octet" field.

Here, a payload portion of the STATUS-PDU (NACK) may include multiple sets of "Selective NACK SN" fields, "Selective NACK First Octet" fields and "Selective NACK Last Octet" fields.

The "Control PDU Type" field is a field showing a type of the RLC-control-PDU. For example, as a type of the RLC-control-PDU, a STATUS-PDU (ACK) or a STATUS-PDU (NACK) or the like is assumed.

The "Selective NACK SN" field is a field showing a sequence number of the RLC-data-PDU for which RLC retransmission has been determined to be necessary in a receive window of the RLC sublayer of the receiving-side apparatus.

The "Selective NACK First Octet" field is a field showing that from which byte (octet) in the RLC-data-PDU specified by the "Selective NACK SN" field needs to be retransmitted.

The "Selective NACK Last Octet" field is a field showing that up to which byte (octet) in the RLC-data-PDU specified by the "Selective NACK SN" field needs to be retransmitted.

The retransmission buffer 15 is configured to store an RLC-data-PDU or an RLC-data-Sub-PDU from the ACK waiting buffer 14 therein.

The RLC-PDU transmitter unit 16 is configured to transmit, to the MAC sublayer, the RLC-data-PDU transmitted from the segmentation-concatenation processor unit 13 and the RLC-data-PDU stored in the retransmission buffer 15, in a case where a data transmission event is notified from the MAC sublayer.

Here, the RLC-PDU transmitter unit 16 may be configured to generate an RLC-data-PDU-piggybacked-control-PDU by adding the RLC-control-PDU (STATUS-PDU or the like) stored in the RLC-control-PDU buffer 20 to the RLC-data-PDU to be transmitted, and then to transmit the RLC-data-PDU-piggybacked-control-PDU.

The re-segmentation processor unit 17 is configured to generate multiple RLC-data-Sub-PDUs by segmenting one RLC-data-PDU or RLC-data-Sub-PDU stored in the retransmission buffer 15 in accordance with the communication state of the radio link, that is, in accordance with the allowable amount of transmission data notified by the MAC layer along with the notification. Specifically, the re-segmentation processor unit 17 is configured to perform re-segmentation processing for the RLC-data-PDU or the RLC-data-Sub-PDU stored in the retransmission buffer 15.

Figure 6:
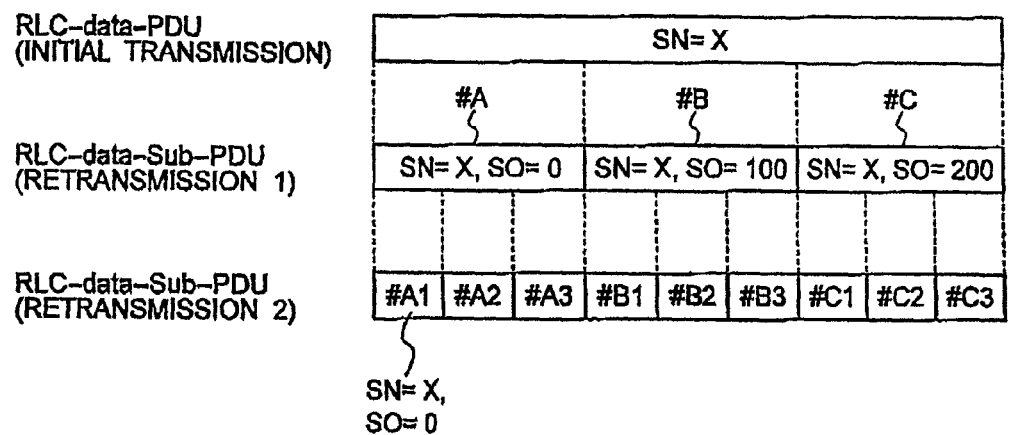
FIG. 6 is a diagram for describing re-segmentation processing to be performed in the RLC sublayer in a mobile station and a radio base station according to the first embodiment of the present invention.

In an example in FIG. 6, the re-segmentation processor unit 17 segments an RLC-data-PDU (SN=x) into three RLC-data-Sub-PDUs #A to #C at the first retransmission, and segments the three RLC-data-Sub-PDUs #A to #C into three RLC-data-Sub-PDUs #A1 to #A3, #B1 to #B3 and #C1 to #C3, respectively.

The RLC-PDU transmitter unit 18 is configured to transmit, to the MAC sublayer, the RLC-data-Sub-PDU that has been subjected to the re-segmentation processing by the re-segmentation processor unit 17, in a case where a data transmission event is notified from the MAC sublayer.

Here, the RLC-PDU transmitter unit 18 may be configured to generate an RLC-Sub-PDU-piggybacked-control-PDU by adding the RLC-control-PDU (STATUS-PDU or the like) stored in the RLC-control-PDU buffer 20 to the RLC-data-Sub-PDU to be transmitted, and to transmit the RLC-data-Sub-PDU-piggybacked-control-PDU.

The RLC-control-PDU generation unit 19 is configured to generate a STATUS-PDU (ACK/NACK) in accordance with a notification from the reordering buffer 32 at the timing of generating a retransmission request (a time point at which an event that becomes a STATUS-PDU generation and transmission trigger occurs, or immediately before the first radio transmission opportunity after the event that becomes a STATUS-PDU generation and transmission trigger occurs, or a time point at which a STATUS-prohibit-timer that is active when the event that becomes a STATUS-PDU generation and transmission trigger occurs expires).

Figure 8:
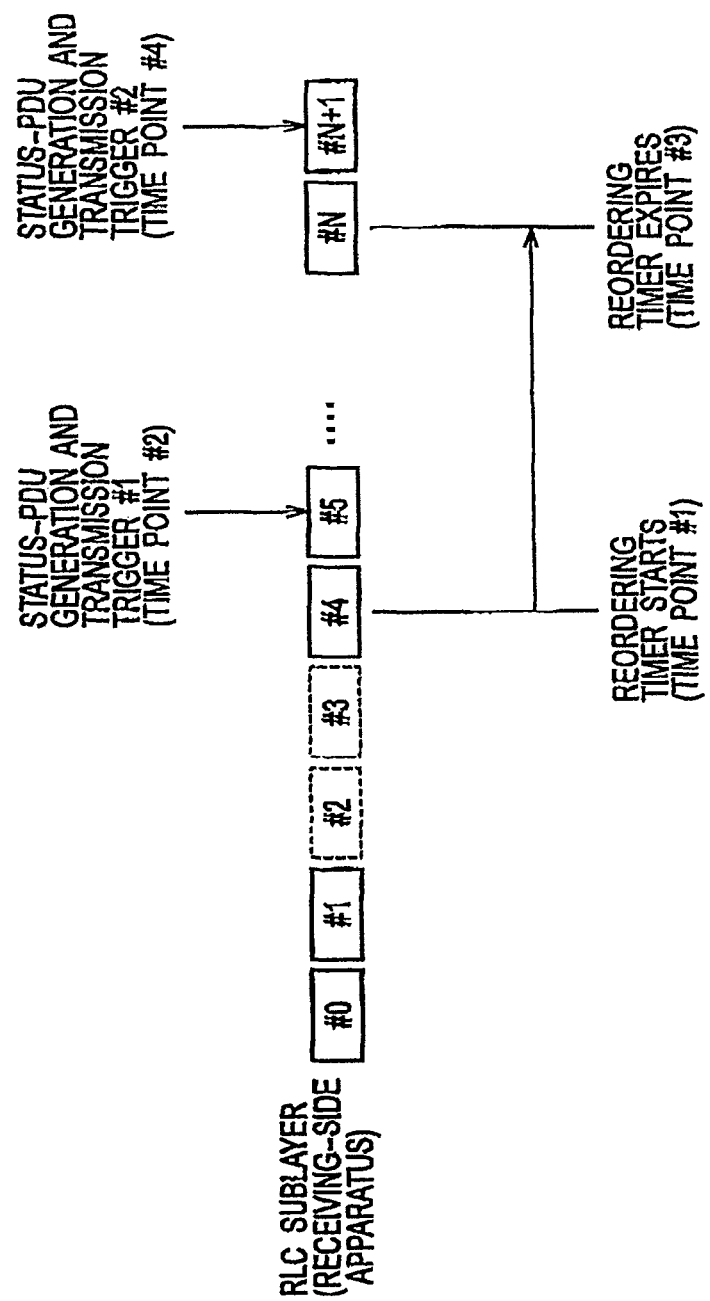
FIG. 8 is a diagram for describing an operation of an RLC sublayer in a mobile station and a radio base station according to the first embodiment of the present invention.

Specifically, as shown in FIG. 8, the RLC-control-PDU generation unit 19 is configured not to take RLC-data-PDUs with sequence numbers #2 and #3 into consideration when generating a STATUS-PDU at a time point (time point #2) of a STATUS-PDU generation and transmission trigger #1. This is because the RLC-control-PDU generation unit 19 is not notified by the reordering buffer 32 that a retransmission request for the RLC-data-PDUs with the sequence numbers #2 and #3 (not received yet) is necessary, at the time point (time point #2) of the STATUS-PDU generation and transmission trigger #1.

The RLC-control-PDU generation unit 19 is configured to include the RLC-data-PDUs with the sequence numbers #2 and #3 in a STATUS-PDU (NACK) generated at a time point (time point #4) of a STATUS-PDU generation and transmission trigger #2, thereafter. This is because the RLC-control-PDU generation unit 19 is already notified by the reordering buffer 32 that a retransmission request for the RLC-data-PDUs with the sequence numbers #2 and #3 is necessary, at the time point (time point #4) of the STATUS-PDU generation and transmission trigger #2.

Here, the RLC-control-PDU generation unit 19 may be configured to operate in the following manner when notified by the reordering buffer 32 that a retransmission request for multiple RLC-data-PDUs is necessary before an event that becomes a STATUS-PDU generation and transmission trigger occurs. The RLC-control-PDU generation unit 19 may be configured to individually manage the sequence numbers of all of the RLC-data-PDUs for which the reordering buffer 32 notified that a retransmission request is necessary and then to include the sequence numbers of all of such RLC-data-PDUs when generating a STATUS-PDU in this case.

In addition, the RLC-control-PDU generation unit 19 may be configured to manage only the largest sequence number among the sequence numbers of the RLC-data-PDUs notified by the reordering buffer 32 as the RLC-data-PDUs for which a retransmission request is necessary (for example, to manage this sequence number as a "state variable T_SN_STATUS"). Then, the RLC-control-PDU generation unit 19 may be configured to include, at the time of generating a STATUS-PDU, the sequence numbers of all the RLC-data-PDUs which are not greater than the state variable "T_SN_STATUS", and which are the sequence numbers of the unreceived RLC-data-PDUs in the reception window. In other words, the RLC-control-PDU generation unit 19 may manage, as the "state variable T_SN_STATUS," only the largest sequence number among the sequence numbers of the RLC-data-PDUs notified as a result of the determination made by the reordering buffer 32 that a retransmission request for the RLC-data-PDUs is necessary (determination result), and may generate a STATUS-PDU on the basis of the "state variable T_SN_STATUS".

In addition, in a case where the RLC-control-PDU generation unit 19 has already received an RLC-data-PDU with a sequence number following the largest sequence number among the sequence numbers of the RLC-data-PDUs notified by the reordering buffer 32 as the RLC-data-PDUs for which a retransmission request is necessary, the RLC-control-PDU generation unit 19 may manage only the smallest sequence number that is larger than the sequence number of the received RLC-data PDU with a sequence number following the largest sequence number among the sequence numbers of the RLC-data-PDUs notified by the reordering buffer 32 as the RLC-data-PDUs for which a retransmission request is necessary and that is among the unreceived RLC-data-PDUs (for example, manage the smallest sequence number as a state variable "T_SN_STATUS"), and then generate a STATUS-PDU on the basis of the "T_SN_STATUS". Specifically, the RLC-control-PDU generation unit 19 may generate a STATUS-PDU to include, therein, the sequence numbers of all the RLC-data-PDUs, which are smaller than the "T_SN_STATUS" and which are the sequence numbers of the unreceived RLC-data-PDUs in the reception window.

Note that, as the event that becomes a STATUS-PDU generation and transmission trigger, the following notifications, or expiration of a periodic timer in the RLC-control-PDU generation unit 19 or the like are conceivable: a notification from the reordering buffer 32 that a retransmission request for a specific RLC-data-PDU is necessary; a notification from the reordering buffer 32 that a Poll bit is detected; or a notification from the reordering buffer 32 that the usage rate of the reception window exceeds a specific threshold.

Moreover, the RLC-control-PDU generation unit 19 may be configured to suppress excessive transmission of STATUS-PDUs by application of the "STATUS-prohibit timer".

In a case where the "STATUS-prohibit timer" is applied, the RLC-control-PDU generation unit 19 starts the "STATUS-prohibit-timer" when a STATUS-PDU is transmitted.

Then, even if the event that becomes a STATUS-PDU generation and transmission trigger occurs, the RLC-control-PDU generation unit 19 does not generate and transmit a STATUS-PDU while the "STATUS-prohibit-timer" is running.

Thereafter, at the time point when the "STATUS-prohibit-timer" expires, the RLC-control-PDU generation unit 19 generates and transmits a STATUS-PDU in a case where the event that becomes a STATUS-PDU generation and transmission trigger occurs while the "STATUS-prohibit-timer" is running.

The RLC-control-PDU buffer 20 is configured to store the RLC-control-PDU generated by the RLC-control-PDU generation unit 19.

The de-multiplex unit 31 is configured to extract a STATUS-PDU from the RLC-PDU received from the MAC sublayer, and then to forward the STATUS-PDU to the ACK waiting buffer 14, and also to extract and then to forward an RLC-data-PDU and an RLC-data-Sub-PDU to the reordering buffer 32.

Note that, the MAC sublayer is configured to transmit an RLC-PDU to the RLC sublayer without performing reordering processing as described above.

The reordering buffer 32 is configured to perform the reordering processing for the stored RLC-data-PDU.

Specifically, the reordering buffer 32 is configured to cause RLC-data-PDUs (in-sequence) stored in the order of the sequence numbers to be stored in the reassembly buffer 33.

Meanwhile, for RLC-data-PDUs not stored in the order of the sequence numbers (out-of-sequence), the reordering buffer 32 is configured to determine if a retransmission request for the RLC-data-PDUs is necessary, by use of the reordering timer, and is configured to notify the RLC-control-PDU generation unit that a retransmission request for the unreceived RLC-data-PDUs is necessary, in a case where such a determination is made.

The reordering buffer 32 is configured to determine whether or not a packet not received yet is under retransmission control processing (HARQ retransmission control processing) in the MAC sublayer.

In addition, the reordering buffer 32 is configured to instruct, on the basis of the aforementioned result of the determination, the RLC-control-PDU generation unit 19 to generate a STATUS-PDU (NACK) (retransmission request) only including a packet which is not received yet and for which the retransmission control processing (HARQ retransmission control processing) is not performed in the MAC sublayer.

Specifically, as shown in FIG. 8, the reordering buffer 32 is configured to start the reordering timer in a case where the RLC-data-PDU with the sequence number #4 is received at the time point #1 before the RLC-data-PDUs with the sequence numbers #2 and #3 are received.

In this case, the reordering buffer 32 does not notify the RLC-control-PDU generation unit 19 that a retransmission is necessary for the RLC-data-PDUs with the sequence numbers #2 and #3, since there is a possibility that the retransmission control processing (HARQ retransmission control processing) is still performed in the MAC sublayer for the RLC-data-PDUs with the sequence numbers #2 and #3. This is because the reordering timer started at the reception of the RLC-data-PDU with the sequence number #4 does not expire yet at the time point #2 (the time point #1 of the STATUS-PDU generation and transmission trigger).

Thereafter, the reordering timer started at the reception of the RLC-data-PDU with the sequence number #4 expires at the time point #3. Thus, the reordering buffer 32 determines that the retransmission control processing (HARQ retransmission control processing) is not performed any more in the MAC sublayer for the RLC-data-PDUs with the sequence numbers #2 and #3 and that there is no possibility that the RLC-data-PDUs with the sequence numbers #2 and #3 are received by the RLC sublayer of the receiving-side apparatus. Then, the reordering buffer notifies the RLC-control-PDU generation unit 19 that retransmission of the RLC-data-PDUs with the sequence numbers #2 and #3 is necessary.

Note that, the reordering buffer 32 may detect, without using the reordering timer as shown in FIG. 8, an RLC-data-PDU that needs to be retransmitted, that is, the RLC-data-PDU which has not been received yet and is already out of the retransmission control processing in the MAC sublayer.

In addition, in a case where an RLC-data-PDU having a sequence number following the largest sequence number among the sequence numbers of the RLC-data-PDUs for which retransmission requests are determined to be necessary is received, the reordering buffer 32 may notify the RLC-control-PDU generation unit 19 of the RLC-data-PDU which has the larger sequence number than that of this RLC-data-PDU and which has the smallest sequence number among the unreceived RLC-data-PDUs.

Here, the timing at which the reordering buffer 32 notifies the RLC-control-PDU generation unit 19 of the aforementioned sequence number may be a timing at which the reordering timer expires or at an updated timing (timing at which the aforementioned sequence number is updated, for example).

Note that, in a case where the RLC-data-PDU having the sequence number following the largest sequence number among the sequence numbers of the RLC-data-PDUs for which retransmission requests are determined to be necessary is not received, the reordering buffer 32 may notify the RLC-control-PDU generation unit 19 of the sequence number following the largest sequence number among the sequence numbers of the RLC-data-PDUs for which retransmission requests are determined to be necessary.

The reordering buffer 32 is configured to assemble an RLC-data-PDU in a case where the RLC-data-PDU can be assembled from stored RLC-data-Sub-PDUs.

The RLC-SDU reassembly unit 34 is configured to assemble and then to transmit RLC-SDUs to an upper layer in the order of the sequence numbers in a case where the RLC-SDUs can be assembled from the RLC-data-PDUs stored in the reassembly buffer 33.

(Operations of Mobile Communication System According to the First Embodiment of the Present Invention)

A description will be given of operations of the receiving-side apparatus in the mobile communication system according to the first embodiment of the present invention with reference to FIG. 9.

Figure 9:
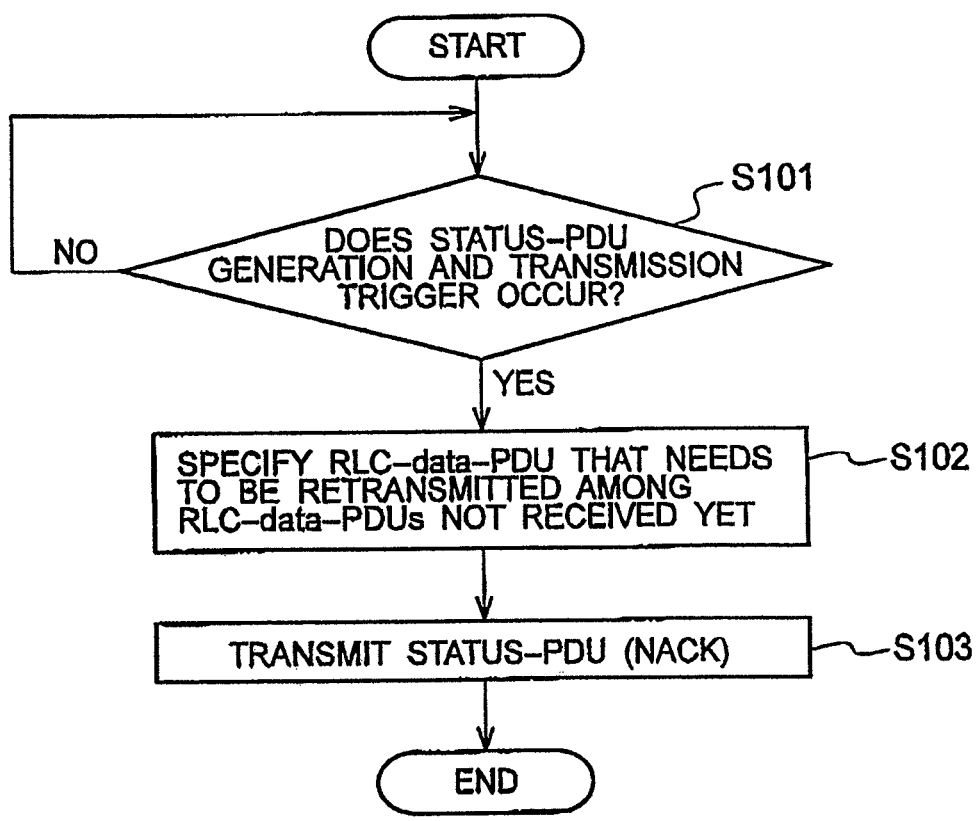
FIG. 9 is a flowchart showing an operation of an RLC sublayer in a mobile station and a radio base station according to the first embodiment of the present invention.

As shown in FIG. 9, when the event that becomes a STATUS-PDU generation and transmission trigger occurs in step S101, the RLC sublayer of the receiving-side apparatus specifies, in step S102, an RLC-data-PDU that needs to be retransmitted among RLC-data-PDUs (or RLC-data-Sub-PDUs) not received yet.

In step S103, the RLC sublayer of the receiving-side apparatus generates and transmits a STATUS-PDU (NACK) for the RLC-data-PDU specified as the RLC-data-PDU that needs to be retransmitted.

(Effects and Advantages of the Mobile Communication System According to the First Embodiment of the Present Invention)

With the mobile communication system according to the first embodiment of the present invention, in a case where the MAC sublayer does not perform the reordering processing for received RLC-PDUs, the RLC sublayer can appropriately detect an RLC-data-PDU (or RLC-data-Sub-PDU) that needs to be retransmitted, that is, the RLC-data-PDU which is not received yet and for which the retransmission control processing is not performed any more in the MAC sublayer, and then transmit a STATUS-PDU (NACK) for the detected RLC-data-PDU.

The present invention has been described above by using the aforementioned embodiments. However, it is obvious to those skilled in the art that the present invention is not limited to the embodiments described in this description. The present invention can be implemented as a revised and modified form without departing from the spirit and scope of the present invention, which are defined by the appended claims. Thus, the contents of this description aim to describe the exemplification and not to impose any limitation on the present invention.

Note that, the entire contents of Japanese Patent Application No. 2007-101188 (filed on Apr. 6, 2007) are incorporated in this description by reference.

Industrial Applicability

As described above, the retransmission request transmitting method and the receiving-side apparatus according to the present invention are advantageous because they can prevent an RLC sublayer from transmitting a retransmission request for an RLC-data-PDU being in HARQ retransmission control processing in a MAC sublayer, in a case where the MAC sublayer does not perform reordering processing for received RLC-PDUs.

The invention claimed is:

1. A retransmission request transmitting method in which a Medium Access Control (MAC) sublayer of a receiving-side apparatus does not perform reordering processing and a radio link control (RLC) sublayer of the receiving-side apparatus transmits a STATUS-PDU (Protocol Data Unit) for an RLC-data-PDU transmitted from an RLC sublayer of a transmitting-side apparatus, the method comprising the steps of:
   starting, at the RLC sublayer of the receiving-side apparatus, a reordering timer, in a case where a second RLC-data-PDU with a sequence number larger than a sequence number of a first RLC-data-PDU is received before one or a plurality of first RLC-data-PDUs are received;
   managing, at the RLC sublayer of the receiving-side apparatus, as a state variable, a minimum value of a sequence number of an RLC-data-PDU which is not notified by a reordering buffer that a retransmission request is necessary, out of a third RLC-data-PDU with a sequence number larger than the sequence number of the second RLC-data-PDU, at the time of expiration of the reordering timer;
   generating and transmitting, at the RLC sublayer of the receiving-side apparatus, the STATUS-PDU, based on inclusion of the sequence numbers of all the RLC-data-PDUs which are not yet received in a reception window, the sequence numbers being less than the managed state variable;
   starting, at the RLC sublayer of the receiving-side apparatus, a STATUS-prohibit-timer when the STATUS-PDU is transmitted, wherein the RLC sublayer of the receiving-side apparatus does not generate and transmit the STATUS-PDU while the STATUS-prohibit-timer is running, even if a STATUS-PDU generation and transmission trigger occurs, and
   when the STATUS-prohibit-timer expires, the RLC sublayer of the receiving-side apparatus generates and transmits the STATUS-PDU if an event triggering the STATUS-PDU generation and transmission occurs while the STATUS-prohibit timer is running,
   wherein the STATUS-PDU includes multiple sets of Selective NACK (Negative Acknowledgement) SN field, and the Selective NACK SN field is a field showing a sequence number of the RLC-data-PDU for which RLC retransmission has been determined to be necessary in a receive window of the RLC sublayer of the receiving-side apparatus, and
   wherein each of the multiple sets of Selective NACK SN fields is associated with a corresponding first octet field and a last octet field, wherein each pair of the corresponding first octet field and a last octet field specifies a range of octets within the RLC-data-PDU specified by the corresponding selective NACK SN field.

2. A receiving-side apparatus configured to not perform reordering processing in a Medium Access Control (MAC) sublayer and to transmit a retransmission request for a radio link control-data-(RLC)-data-PDU (Protocol Data Unit) transmitted from an RLC-sublayer of a transmitting-side apparatus in an RLC sublayer, wherein the receiving-side apparatus comprises a processor and a memory configured to store instructions that when executed by the processor implement the RLC sublayer, wherein:
   the RLC sublayer is configured to start a reordering timer in a case where a second RLC-data-PDU with a sequence number larger than a sequence number of a first RLC-data-PDU is received before one or a plurality of first RLC-data-PDUs are received;

the RLC sublayer is configured to manage, as a state variable, a minimum value of a sequence number of an RLC-data-PDU which is not notified by a reordering buffer that a retransmission request is necessary, out of a third RLC-data-PDU with a sequence number larger than the sequence number of the second RLC-data-PDU, at the time of expirations of the timer;

the RLC sublayer is configured to generate and transmit the STATUS-PDU, based on inclusion of the sequence numbers of all the RLC-data-PDUs which are not yet received in a reception window, the sequence numbers being less than the managed state variable;

the RLC sublayer is configured to start a STATUS-prohibit-timer when the STATUS-PDU is transmitted, wherein the RLC sublayer does not generate and transmit the STATUS-P DU while the STATUS-prohibit-timer is running, even if a STATUS-PDU generation and transmission trigger occurs, and when the STATUS-prohibit-timer expires, the RLC sublayer of the receiving-side apparatus generates and transmits the STATUS-PDU if an event triggering the STATUS-PDU generation and transmission occurs while the STATUS-prohibit timer is running, wherein the STATUS-PDU includes multiple sets of Selective NACK (Negative Acknowledgement) SN field, and the Selective NACK SN field is a field showing a sequence number of the RLC-data-PDU for which RLC retransmission has been determined to be necessary in a receive window of the RLC sublayer of the receiving-side apparatus, and wherein each of the multiple sets of Selective NACK SN fields is associated with a corresponding first octet field and a last octet field, wherein each pair of the corresponding first octet field and a last octet field specifies a range of octets within the RLC-data-PDU specified by the corresponding selective NACK SN field.

* * * * *